United States Patent [19]

Cox et al.

[11] Patent Number: 4,629,369
[45] Date of Patent: Dec. 16, 1986

[54] MANIPULATOR TRANSPORTER

[75] Inventors: William C. Cox, Kirkland; Gordon Cox, Mississauga; George Leskin, deceased, late of Brantford, all of Canada, Mimi Leskien, administratrix

[73] Assignees: Canadian Patents and Development Limited; Societe Canadienne des Brevets et d'Exploitation Limitee, both of Ottawa, Canada

[21] Appl. No.: 666,057

[22] Filed: Oct. 29, 1984
(Under 37 CFR 1.47)

[30] Foreign Application Priority Data

Nov. 8, 1983 [CA] Canada .................................. 440617

[51] Int. Cl.4 ............................................. E21F 13/02
[52] U.S. Cl. .................................... 405/303; 175/219; 405/288
[58] Field of Search ............... 405/303, 288, 290, 291, 405/168, 169, 170, 171; 175/220, 219; 173/23, 22, 27; 299/11, 12

[56] References Cited

U.S. PATENT DOCUMENTS

| | | | |
|---|---|---|---|
| 2,901,232 | 8/1959 | Lewis | 175/219 X |
| 3,892,100 | 7/1975 | Jamison | 405/291 |
| 3,893,520 | 7/1975 | McCormick | 175/219 X |
| 4,076,130 | 2/1978 | Sumner | 405/170 X |
| 4,203,687 | 5/1980 | Sumner | 405/170 |
| 4,218,158 | 8/1980 | Tesson | 405/170 |
| 4,252,475 | 2/1981 | Cobb et al. | 405/290 X |
| 4,290,490 | 9/1981 | Barthe et al. | 175/219 X |
| 4,312,609 | 1/1982 | Culley | 405/291 |
| 4,351,625 | 9/1982 | Selestam et al. | 405/288 X |

*Primary Examiner*—Dennis L. Taylor
*Attorney, Agent, or Firm*—Burns, Doane, Swecker & Mathis

[57] ABSTRACT

A vehicle adapted for transporting and manipulating objects within a confined space, such as a tunnel. The vehicle comprises a pair of side frames interconnected by vertically adjustable front and rear interconnecting members that include horizontal portions onto which a boom is slideably and pivotally connected. Raising and lowering of one or two of the interconnecting members and lateral traversing of one or two of the connected boom portions provides for manipulation of an object or tool attached to the boom.

8 Claims, 1 Drawing Figure

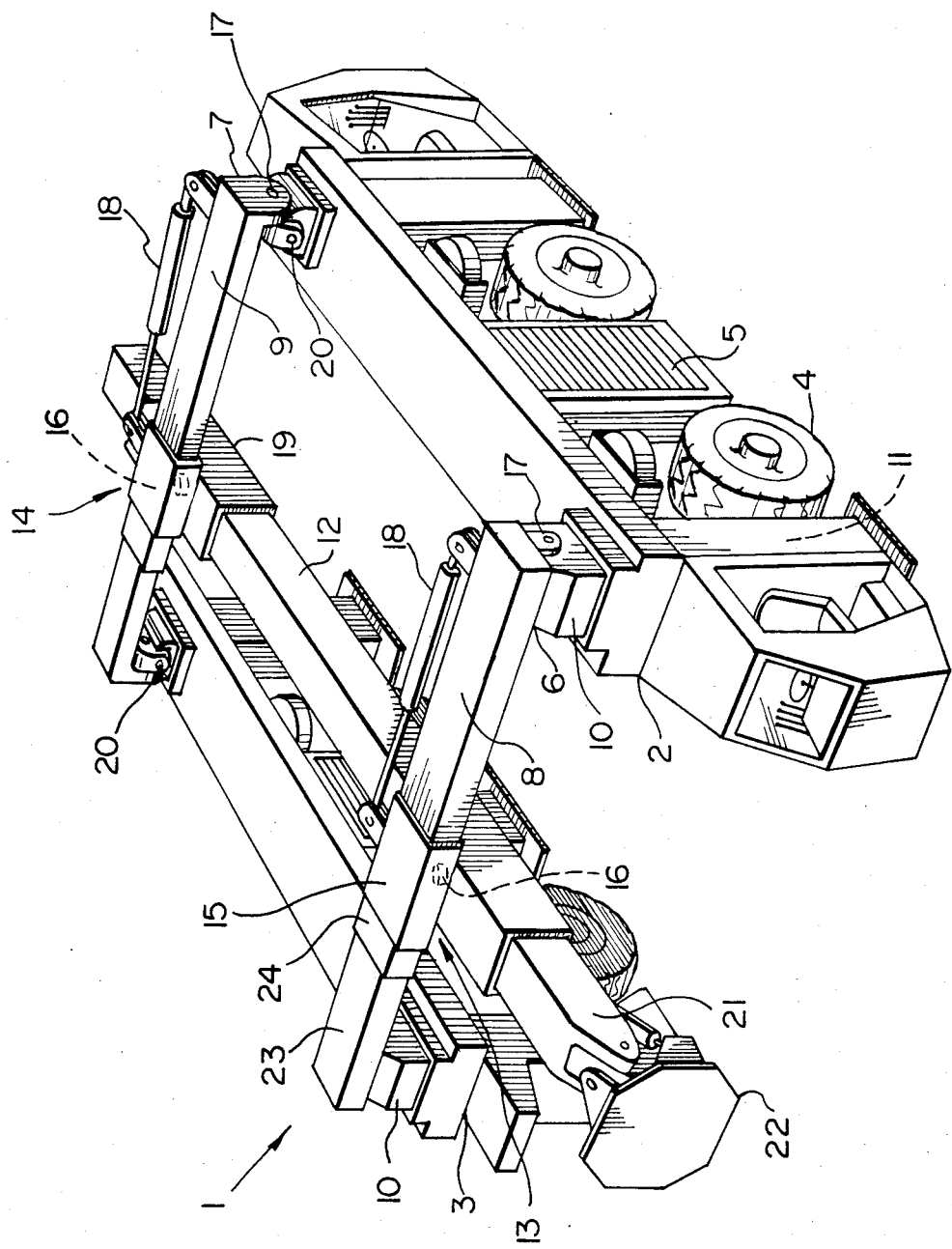

MANIPULATOR TRANSPORTER

BACKGROUND OF THE INVENTION

This invention relates to a vehicle for transporting and manipulating which is particularly suitable for operating in a confined space.

In operations such as tunnel boring the space that is readily available for access to the boring machine is the tunnel produced by the boring machine. With conventional apparatus and procedures, operations on the boring machine, such as dismantling or replacing components, usually requires that a chamber be excavated to provide sufficient space for a conventional boom or crane to operate.

The present invention provides an apparatus that facilitates manipulating and transporting of objects within a confined space, such as a tunnel.

The manipulator transporter of the present invention comprises: a pair of spaced side frames having ground traversing means; front and rear interconnecting members for interconnecting said side frames, said interconnecting members each having a transverse horizontal member, and a pair of spaced depending members slideably connected to a respective side frame: means for raising and lowering each interconnecting member relative to the side frame; a manipulator boom for manipulating an object attached thereto; a pair of boom connecting means one each for connecting the boom to each of the two horizontal members, both of said boom connecting means comprising pivot means allowing the boom to pivot about a vertical axis with respect to the horizontal member, at least one of said boom connecting means comprising a follower for traversing the horizontal member: pivot means allowing the boom to pivot about a horizontal axis parallel with the horizontal member; actuator means associated with each of the front and rear of the boom operative to position the respective front and rear portion of the boom laterally along the horizontal member; and longitudinal sliding means for accommodating variations in the distance between the boom connecting means resulting from pivotal motion of the boom.

BRIEF DESCRIPTION OF THE DRAWING

The FIGURE is a perspective view illustrating one embodiment of the manipulator transporter of the present invention.

DESCRIPTION OF PREFERRED EMBODIMENT

With reference to FIG. 1, the manipulator transporter 1 of the present invention comprises a pair of side frames 2 and 3 having ground traversing means shown as wheels 4 driven by a suitable motor 5. Interconnecting the side frames 2 and 3 are front and rear interconnecting members 6 and 7, respectively. The interconnecting members 6 and 7 each comprise a horizontal member 8 and 9, respectively, and a pair of spaced depending members 10 slideably connected to a respective side frame 2 and 3. Each interconnecting member 6 or 7 may be raised or lowered by suitable means, such as hydraulic actuators 11.

Connected to the horizontal members 8 and 9 are a manipulator boom 12. The boom is connected by front and rear boom connecting means 13 and 14, each is shown comprising a follower 15 for traversing along the horizontal members 8 or 9, and pivot means 16 allowing the boom to pivot about a vertical axis. For a simpler arrangement, only one of the boom connecting means 13 or 14 need have a follower 15, although this reduces the maximum lateral travel of the boom.

Associated with the horizontal members 6 and 7 are pivot means 17 to allow the boom to pivot about a horizontal axis parallel with the horizontal members.

Associated with each of the front and rear of the boom are actuator means 18 for positioning the respective front and rear portions of the boom transversely along the respective horizontal members 8 and 9.

The boom 12 is provided with longitudinal sliding means 19 to accommodate variations in the distance between the boom connecting means resulting from rotational motion of the boom. An alternative to the arrangement shown may take the form of a boom having two telescopically interconnected portions wherein the sliding telescoping connection lies between the front and rear interconnecting means 13 and 14.

To provide independent pitching motion of the side frames over uneven terrain, one of the interconnecting members (7) may be provided with pivot means 20 to allow pivoting of the depending members 10 relative to the horizontal member 9 about a horizontal axis perpendicular with a longitudinal axis of the horizontal member. With this provision it is necessary that one of the boom connecting means be provided with means to allow the boom to pivot relative to the horizontal member 9 about a horizontal axis perpendicular to the horizontal member. As the pivotal motion required is small, it can be accommodated by free play between the various connected elements.

The boom 12 will preferably be provided with a telescoping or longitudinally extendable portion 21 with suitable actuator means to provide longitudinal movements. Also, the end of the boom may be provided with a head attachment 22 providing rotary and pivoting motion.

The manipulator transporter of the present invention may be provided with additional known features such as outriggers and roof jacks for increased stability during certain operations.

Preferably, the horizontal members 8 and 9 will include a pair of telescoping sections 23 and 24 to provide adjustment of the width of the manipulator transporter.

In operation, the manipulator transporter 1 may be used for manipulating and transporting objects. For transporting, the operation may be similar to that of a conventional straddle carrier. Conventional means may be used to attach an object to the transporter, or the object may be attached to the boom.

With reference to the FIGURE, manipulating of an object or tool involves manipulating the boom 12. Vertical motion of an object is obtained by raising and lowering of the interconnecting members 6 and/or 7 using the actuators 11. It can be seen that raising one interconnecting member while lowering the other effects pivoting of the boom about a horizontal axis and also provides for maximum vertical travel of the boom end. Lateral motion of the boom is effected by actuation of one or both actuators 18 causing the boom connecting means 13 to traverse the horizontal members 8 and/or 9. Movement in opposite directions at the front and rear effects pivoting of the boom in a horizontal plane and maximizes the horizontal lateral travel of the boom. Longitudinal motion is provided by extension and retraction of the extendable portion 21. It will be understood that the various motions described above may be used independently or in combination.

The preferred use envisaged for the manipulator transporter is in conjunction with tunnel boring operations. The manipulator transporter facilitates the transporting of equipment or components for the erecting, servicing or dismantling of the tunnel boring machine within the confines of the tunnel. The present arrangement of the manipulator boom requires less head room to operate as compared to conventional booms or cranes. Also, the longitudinal cross-section is such that it can pass over or straddle other equipment or objects while a manipulating operation is performed.

The manipulator transporter of the present invention may be used for other purposes where both manipulating and transporting is involved, and adaptations for the specific purpose may be made.

We claim:

1. A manipulator transporter comprising:
   a pair of spaced side frames having ground traversing means;
   front and rear interconnecting members for interconnecting said side frames, said interconnecting members each having a transverse horizontal member, and a pair of spaced depending members slideably connected to a respective side frame;
   means for raising and lowering each interconnecting member relative to the side frame;
   a manipulator boom for manipulating an object attached thereto;
   a pair of boom connecting means one each for connecting the boom to each of the two horizontal members, both of said boom connecting means comprising pivot means allowing the boom to pivot about a vertical axis with respect to the horizontal member, at least one of said boom connecting means comprising a follower for traversing the horizontal member;
   pivot means allowing the boom to pivot about a horizontal axis parallel with the horizontal member;
   actuator means associated with each of the front and rear of the boom operative to position the respective front and rear portion of the boom laterally along the horizontal member; and
   longitudinal sliding means for accommodating variations in the distance between the boom connecting means resulting from pivotal motion of the boom.

2. The apparatus of claim 1 wherein the boom comprises an extendable portion.

3. The apparatus of claim 1 wherein one of the interconnecting members comprises pivot means to allow each of the depending members to pivot relative to the horizontal member about a horizontal axis perpendicular to the longitudinal axis of the horizontal member.

4. The apparatus of claim 3 wherein one of said boom connecting means comprises pivot means allowing the boom to pivot about a horizontal axis perpendicular to the horizontal member.

5. The apparatus of claim 1 wherein the horizontal member comprises a pair of slideably interconnecting members for adjusting the spacing of said side frames.

6. The apparatus of claim 1 further comprising a head attachment for an end of the boom, said head attachment having a rotatable object engaging member.

7. The apparatus of claim 6 wherein said head attachment is pivotally connected to said boom.

8. The apparatus of claim 1 wherein both of said boom connecting means comprise a follower for traversing the horizontal member.

* * * * *